(12) United States Patent
Aue

(10) Patent No.: US 7,447,281 B2
(45) Date of Patent: Nov. 4, 2008

(54) METHOD FOR THE IMPROVED RECOGNITION OF THE VALIDITY OF IEEE 802.11A SIGNALS, AND CIRCUIT ARRANGEMENT FOR PERFORMING THE METHOD

(75) Inventor: Volker Aue, Dresden (DE)

(73) Assignee: NXP B.V., Eindhoven (NL)

( * ) Notice: Subject to any disclaimer, the term of this patent is extended or adjusted under 35 U.S.C. 154(b) by 694 days.

(21) Appl. No.: 10/925,046

(22) Filed: Aug. 24, 2004

(65) Prior Publication Data

US 2005/0063495 A1    Mar. 24, 2005

(30) Foreign Application Priority Data

Aug. 29, 2003    (DE)    ................ 103 39 832

(51) Int. Cl.
*H04L 27/06*    (2006.01)

(52) U.S. Cl. .................................... 375/341

(58) Field of Classification Search ............... 375/340, 375/341, 262, 265, 260; 370/208; 714/792, 714/794, 795

See application file for complete search history.

(56) References Cited

U.S. PATENT DOCUMENTS

| 6,574,289 | B1 * | 6/2003 | Tran et al. ................ 375/341 |
| 2004/0013084 | A1 * | 1/2004 | Thomas et al. ............ 370/210 |
| 2006/0187096 | A1 * | 8/2006 | Zheltov et al. ............. 341/67 |
| 2007/0081532 | A1 * | 4/2007 | Kim et al. ................ 370/389 |

* cited by examiner

*Primary Examiner*—Chieh M Fan
*Assistant Examiner*—Aristocratis Fotakis

(57) ABSTRACT

To improve the recognition of the validity of coded control information that is transmitted, together with associated useful data, as a data signal and that is decoded at the receiver by means of a Viterbi decoder (VDCOD), it is proposed that at least an end section of the received, convolution-coded control information is prefixed to this same information, the length of the end section being at least that of the convolution-coded tail bit-sequence, and the information that has been assembled in this way being fed to the Viterbi decoder to allow the convolution-coded control information to be decoded.

20 Claims, 6 Drawing Sheets

METHOD FOR THE IMPROVED RECOGNITION OF THE VALIDITY OF IEEE 802.11A SIGNALS, AND CIRCUIT ARRANGEMENT FOR PERFORMING THE METHOD

The invention relates to a method for the improved recognition of the validity of IEEE 802.11a signals as defined in the preamble to claim 1, and to a circuit arrangement for performing the method.

A major proportion of wireless local area networks (WLANs) are nowadays based on one of the IEEE 802.11 standards. These have also acquired great significance in connection with the wider use of Ethernet networks, to enable the LAN to be of a more flexible design. A major problem with a hard-wired LAN is the laying of the cables.

Because, as explained above, WLANs are highly attractive, a great deal of development effort has been put into the standards over the past few years, with the aim of further developing them. The original IEEE 802.11 standard lays down a data transmission rate of one or two Mbit/s on the 2.4 GHz band. The IEEE 802.11b standard lays down data rates of 5.5 and 11 Mbit/s in the 2.4 GHz frequency band. Also, there is specified in IEEE 802.11a a WLAN having data rates of 6, 9, 12, 18, 24, 36 and 54 Mbit/s in the 5 GHz band. As well as this, an IEEE 802.11g standard has now been passed that extends the IEEE 802.11b standard by supplementing it with the IEEE 802.11a standard at a fundamental frequency of 2.4 GHz.

With the exception of the IEEE 802.11b standard, what the standards mentioned have in common is that the signals to be transmitted are channel-coded at the transmitter end. This channel coding comprises a convolutional coding in which redundancy is added to the data to be transmitted to enable the transmission to take place with greater reliability. In the receiver, this redundancy is removed again by channel decoding using a Viterbi channel decoder. Under the IEEE 802.11a standard, a burst comprises a data structure that has, arranged one behind the other, a so-called PLCP preamble, a PLCP header and the useful data. The PLCP header, which comprises 24 bits, is referred to as a control field (Signal field) and is divided into five subfields RATE (4 bits), RESERVED (1 bit), LENGTH (12 bits), PARITY (1 bit) and TAIL (6 bits). In this case, the RATE subfield gives the transmission rate (type of modulation and code rate), the LENGTH subfield gives the length of the field of useful data, and the TAIL subfield at the end of the PLCP header comprises 6 bits each with a logic value of zero. The purpose of this tail bit-sequence is to set the channel encoder to a defined state, i.e. the "000000" state, at the end of the encoding of the control information, i.e. of the Signal field. It should be pointed out that in the present case the term "PLCP header" is equated with the Signal field representing the control information, but to be exact, under the IEEE 802.11a standard the PLCP header also includes a 16-bit-long SERVICE subfield. As is evident from the makeup of the Signal field, the transmission mode (method of modulation, code rate, data length) specified in the Signal field has to be known if the useful data is to be decoded. Hence, a factor that has a major part to play in the transmission of useful data in WLANs on the basis of the above standards is whether the control information specified in the Signal field is acquired without errors, so that the receiver can then be set to the parameters stated in the Signal field. What is equally important is that the correctness of the control information, i.e. its freedom from errors, should be detected. The contribution that the PARITY subfield can make to this is only a very limited one, because it comprises only a single bit.

In actual operation, it may for example happen that the reception routine is called up in a unit while a data transmission is already taking place from a nearby unit. If the start of a data transmission is then wrongly acquired as part of the signal acquisition routine performed using the PLCP preamble, there is a relatively high probability that, in analyzing the PLCP header, the invalid information will be interpreted as valid and the demodulation algorithm will be started for the data contained in the desired-data field. Depending on the length interpreted for the useful data from the LENGTH subfield and on the PHY mode of the received signal concerned, this may result in long dead times for the entire receiver device during which no data can be received. What is more, even interference on the radio channel may be wrongly interpreted as a PLCP header, which will have the adverse consequences mentioned for the availability of the device to receive.

It is therefore an object of the invention to improve the recognition of the validity of coded control information, which coded control information is transmitted, with the associated useful data, as a data signal and is decoded at the receiver by means of a Viterbi decoder.

As far as the method is concerned, this object is achieved simply by a method having the features given in claim 1. In this case, the control information has, at its end, a preset, (k-1) long tail bit-sequence, a convolutional encoder having a constraint length of k being preloaded with the tail bit-sequence of the control information and, after transmission, the received, convolution-coded control information being decoded in a Viterbi decoder on the basis of the finding of a path in the trellis diagram having a maximum or minimum accumulated metric. The method is characterized in that at least an end section of the received, convolution-coded control information is prefixed to this same information, the length of the end section being at least that of the convolution-coded tail bit-sequence, and the information that has been assembled in this way being fed to the Viterbi decoder to allow the convolution-coded control information to be decoded.

What is achieved by the method according to the invention that is specified above is that, by the recursive path tracing in the trellis diagram for the purpose of determining the decoded information, it is detected with a higher probability than would otherwise be usual if an error has occurred in the bit-sequence detected. By the addition to the convolution-coded control information of at least the end section thereof, a cyclic bit-sequence is generated, and the trials carried out by the inventors indicate that this cyclic bit-sequence, when processed in the Viterbi decoder, gives a substantially improved probability of the acquired and decoded bit-sequence representing the control information being recognized. The trials indicated an improvement by a factor of 64.

The idea underlying the invention is to improve the recognition of convolution-coded control information by feeding to the Viterbi decoder for decoding the convolution-coded control information a bit-sequence that comprises the convolution-coded control information with, prefixed thereto, at least the convolution-coded tail bit-sequence received in the control information. It is true that, because of the enlargement, the additional decoding of the combined convolution-coded bit-sequence involves a greater amount of time being spent, but this disadvantage is far outweighed by the advantage that is described relating to the improved recognition of the validity of received control information.

In principle, the method according to the invention can be applied to all data transmissions in which the data is encoded prior to transmission and there is inserted ahead of the encoded useful data encoded control data that is to be decoded on reception by means of a Viterbi decoder. This control data is not as a rule very extensive, which means that it can be enlarged in accordance with the invention prior to the decoding, and can then be decoded by the Viterbi decoder, without any substantial amounts of time being lost. The method according to the invention is suitable in particular for the 802.11 standards.

Advantageous embodiments of the invention are specified in the dependent claims.

A further improvement in the probability with which the validity of convolution-coded control information is recognized can be achieved by prefixing the received, convolution-coded control information with this same information in its entirety, which means that the information assembled will comprise two identical sets of convolution-coded control information arranged one behind the other, which are then fed to the Viterbi decoder. Trials by the inventors indicate that this gives a further improvement, by a factor of 2, in the recognition of the validity of the control information, and particularly the validity of IEEE 802.11 signals.

In the processing of the decoded, assembled bit-sequence, the latter is then checked in sections.

If the assembled information fed to the Viterbi decoder comprises two sets of convolution-coded control information then, in the processing of the decoded bit-sequence, sections of control information that are associated in the given case can be selected from the two sets of control information and compared with one another. If the two sections match, the control information received can be accepted as valid. As has already been explained above, the term control information or set of control information means the whole of the control information field, i.e., in the case of an IEEE 802.11a burst, the whole of the Signal field, that is to say including the tail bit-sequence, which is 6 bit longs in the case of this standard. What can then advantageously be selected for comparison purposes is a useful or productive part of the control information, i.e. a section of the control information that does not have an associated tail bit-sequence, for comparison with the associated section of control information in the other set of control information. To distinguish them from the useful data proper that follows the control information, these sections of control information will be referred to as useful control information data. However, in addition to this, it is also possible, in the decoded bit-sequence, for that section of the bit-sequence that lies between the two sections of decoded useful control information data to be compared with the desired tail bit-sequence, the control information received being accepted as valid in response to a match being found.

It is particularly advantageous if, in response to different comparisons of this kind, a signal associated with the validity of the control information is generated in each case, and a plurality of these signals are gated with one another logically to generate an overall result.

If the signals mentioned are gated by AND-gating for example, the control information that is decoded is only considered valid in the method according to the invention if the results of all the comparisons are positive.

The method according to the invention is also very well suited to recognizing the mode of transmission at the time in an IEEE 802.11g network. In this case a check is made, in the manner stated, on the validity of a control signal conforming to the IEEE 802.11a standard. If the control information is not recognized as valid, the possibility of a signal modulated by OFDM (orthogonal frequency division multiplexing) can be ruled out and a check is then made to see whether the signal that is present is some other standardized modulated signal that conforms to, for example, the IEEE 802.11b standard, such as, for example, a DSSS (direct sequence spread spectrum) or a CCK (complementary code keying) modulated signal. Because the duration of the preamble is 16 µs under the IEEE 802.11a standard, but is 70 µs under the IEEE 802.11b standard, the method according to the invention thus permits a reliable distinction to be made between the standards IEEE 802.11a and IEEE 802.11b included in standard IEEE 802.11g because, once the control information has been recognized as invalid for an OFDM-modulated signal, there is always enough time left to perform the acquisition of control information associated with the IEEE 802.11b standard.

To allow the decoding process to be optimized, provision may be made for the convolution-coded control information to be acquired as a soft bit-sequence, i.e. by using multi-bit quantization. In comparison with a hard bit-sequence that is quantized with one bit, this "weighted" bit-sequence allows the accumulated metric of a state path in the trellis diagram to be more accurately determined and hence the Signal field of the PLCP header to be more accurately decoded. Advantageously, the means for generating the assembled information may have inserted upstream of it a deinterleaver that passes on the deinterleaved information to the Viterbi processor.

As far as the arrangement is concerned, the above object is achieved by a circuit arrangement having the features specified in claim 13. The circuit arrangement is characterized in that the Viterbi decoder has a means for generating an assembled signal inserted upstream of it, in which signal at least an end section of the received, convolution-coded control information is arranged in front of this same information, the length of this section being at least that of the convolution-coded tail bit-sequence. In addition to this, the circuit arrangement comprises a means for feeding the assembled information to the Viterbi decoder. This feed may be performed directly, but also via an intervening deinterleaver.

In accordance with the invention, the recognition of the validity of convolution-coded control information can be considerably improved by the changes that are specified to the design of a conventional circuit arrangement, which changes involve only a small amount of cost and complication.

For the further processing of the information obtained in the Viterbi decoder, provision may be made for the circuit arrangement according to the invention to have a means for selecting and comparing associated sections of control information in the assembled bit-sequence that is decoded, and a means for producing a logic value that specifies that the sections of control information match. The sections of control information that are to be selected and compared in this case are the sections that correspond, i.e. are identical, in the respective sets of control information that are decoded. For example, in a PLCP header, a single subfield, or even all the subfields, of the PLCP header may be selected in the two sets of control information arranged one behind the other and compared with one another. It is particularly easy for this comparison to be performed in an XOR gating means. If there is a match, a logic signal that specifies this fact can be generated in this way.

In another embodiment of the circuit arrangement according to the invention, the arrangement is fitted with a means by which a section of bit-sequence associated with a tail bit-sequence can be selected in the assembled control information that is decoded. This means is also arranged to compare the section of bit-sequence that has been selected with the preset desired tail bit-sequence, which means that in this case too a logic value can be obtained that specifies the match found in the comparison and that is available for further processing and signaling.

These and other aspects of the invention are apparent from and will be elucidated with reference to the embodiments described hereinafter.

In the drawings:

FIG. 2b is a block diagram of a reception signal path that is associated with the transmission signal path shown in FIG. 2a.

Figure 1:
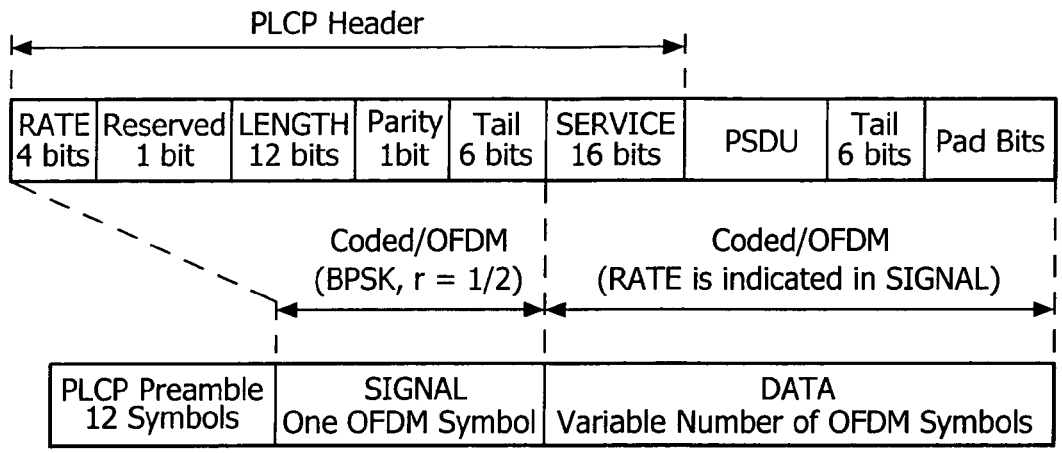
FIG. 1 is a diagram showing the general arrangement of the PLCP frame format under the IEEE 802.11a standard.

The invention will be elucidated below by reference to an IEEE 802.11a or IEEE 802.11g network. FIG. 1 shows the PLCP frame format under the 802.11a standard. A burst comprises three fields: the PLCP preamble, SIGNAL and DATA. The PLCP preamble, 15 which is 16 us long, is used to set the receiver to the incoming data in this case. The SIGNAL field comprises the actual control data and, in detail, it has subfields designated Rate (4 bits), Reserved (1 bit), Length (12 bits), Parity (1 bit) and Tail (6 bits), which means that the control information as a whole comprises 24 bits. As has already been explained above, the RATE and LENGTH subfields are used to specify the transmission rate (type of modulation 20 and code rate) and the length of the field of useful data DATA. The signal field is transmitted as a single OFDM (orthogonal frequency division multiplexing) symbol in which the data to be transmitted is split up onto a plurality of sub-channels of a transmission channel.

Figure 2A:
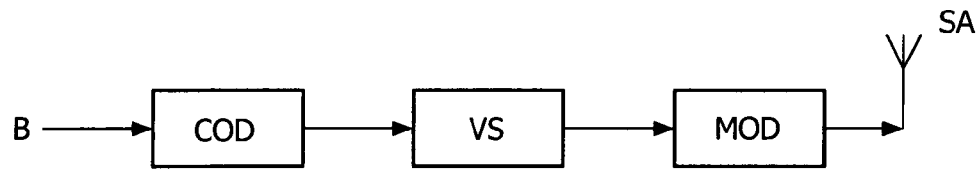
FIG. 2a is a block diagram of a transmission signal path under the IEEE 802.11x standard.
Figure 2B:
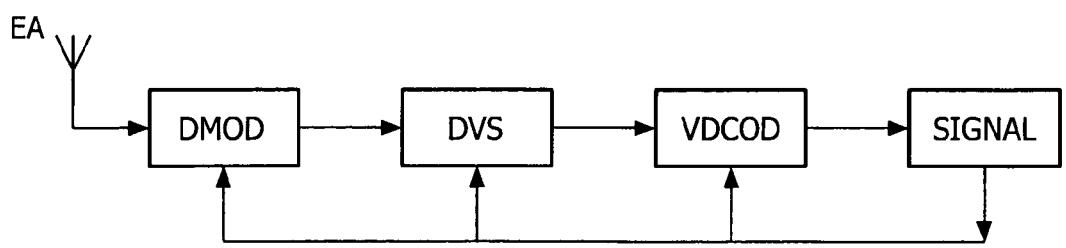

FIGS. 2a and 2b respectively show the transmission signal path and the reception signal path for the burst shown in FIG. 1. The data to be transmitted is fed to a convolutional encoder COD that, for the data in the Signal field, i.e. for the control data, operates at a code rate of $r=\frac{1}{2}$ at the constraint length of $k=7$ that is usual for the IEEE 802.11a standard. What this means is that the 24 bits of control information are converted by the convolutional encoder into 48 bits. The encoded data is fed to an interleaver VS that passes on the interleaved data to a modulator MOD, in which the control data is modulated by the BPSK (binary phase shift keying) method.

The control data in the Signal field is always encoded at the code rate specified above and modulated by the method of modulation specified above, but the useful data in the DATA field that follows the control information is encoded or modulated in the way specified in the control information. Because, in the embodiments described, the invention is applied only to the SIGNAL field containing the control data, no further details need be given of the processing of the data in the DATA field. This being so, the following description will be confined to the processing of the control information, this being such information as is given in the 24-bit wide Signal field in the PLCP frame. For this reason, no additional devices of the kind that are required for other methods of modulation, such as a punctuator for example, are shown in FIGS. 2a and 2b.

Referring once again to FIG. 2a, the convolution-coded, BPSK-modulated Signal field (48 bits) is beamed out from the transmitting antenna SA as a single OFDM symbol. The radio signal travels the distance between the point of transmission and the point of reception and is received by the receiving aerial EA and fed to an ODFM demodulator Demod and is demodulated thereby. The interleaving is reversed in the deinterleaver DVS and the pre-processed data is then fed to the Viterbi decoder VDCOD.

In principle, the convolutional coding of the control information given in the signal field is cancelled out again in the Viterbi decoder. What is used for this purpose is a state diagram for the encoder COD in which a stream of data entering the shift register is assigned to a corresponding sequence of states of the encoder in what is termed a trellis diagram, one such possible sequence of states being termed a path. Because the constraint length k in the encoder COD is 7, the shift register of the encoder can accept $2^{k-1}$, which is 64, states in the present case. Because the sequence of states in the trellis diagram that were passed through in the convolutional encoder COD is not of course known at the receiver, this sequence is decoded by the Viterbi decoder VDCOD on the basis of finding a path in the trellis diagram having a maximum or minimum accumulated metric. What is done in this case is to calculate, for each change of state, a transition metric, which is a measure of the probability of the transition in question between two states. The one of the two possible transitions for which the sum of the transition metric and the metric for the predecessor state is a maximum or a minimum (depending on the method) is selected and forms the next point of departure for determining the next section of the path. Because one of the two possible paths is rejected each time, the result is the method described for determining 64 possible paths in the trellis diagram. The path that, in the end, has the maximum or minimum accumulated metric gives the sequence of states of the convolutional encoder that is being looked for, and this defines the bits that were fed into the encoder, which bits can be determined by known back-tracing in the Viterbi decoder VDCOD, by which means the bit-sequence that is being looked for, which is the present case is the bit-sequence for the control information, is established. The PARITY subfield, which comprises 1 bit, is conventionally used to determine the validity of the recovered control information. In addition to this, it is also usual to perform appraisals of plausibility with regard to whether the LENGTH and/or RATE subfields are of permitted values. If these fields have values that are not within the permitted range, it can be concluded that the PLCP header is not correct.

As is shown in FIG. 2b, the information that has been found in this way on the rate and on the length of the succeeding useful data is fed to the demodulator DMOD, the deinterleaver DVS and the Viterbi decoder VDCOD to enable these to be set to process the useful data that is now arriving within the PLCP frame.

Figure 3:
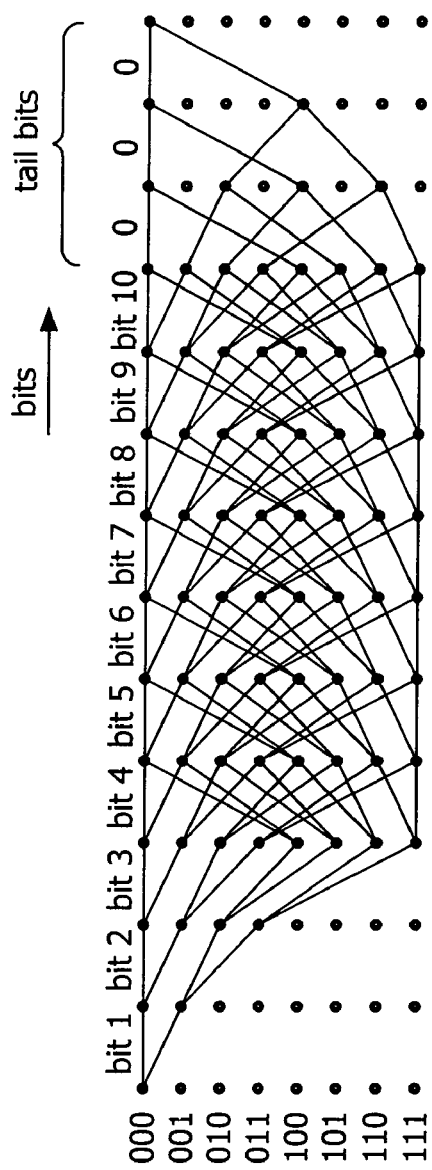
FIG. 3 is a normal trellis diagram for a 10-bit-long control data field having a tail bit-sequence comprising 3 bits.

The explanation of the transmission of data under the IEEE 802.11a standard that has been given up to this point relates to the conventional method in which the convolution-coded control information is fed to the Viterbi decoder unchanged. For this purpose, reference will also be made to FIG. 3, which shows the trellis diagram determined in the encoder. To simplify the representation, what is assumed in FIG. 3 is a 10-bit-wide control field having a constraint length for the encoder of $k=4$. Suffixed to the 10 bits of control information proper are 3 bits having a logic value of "zero", which in this case represent the tail bit-sequence. As in the IEEE 802.11a standard, the code rate for the signal field is r=½ in this case, i.e. the control information, which is 10 bits long in this case, is doubled in the convolutional encoder. Due to the constraint length of k=4, the trellis diagram has eight different states. As can be seen from the Figure, the last three transitions on the right-hand side represent the three end or tail bits. As can also be seen, the convolutional encoder starts from the zero state because, as usual, the encoder is preloaded with the tail bit-sequence, which was known beforehand. However, the fact of the data being transmitted in a transmission medium that is affected by noise means that, in the trellis diagram determined in the Viterbi decoder, the first state on the most optimum state path does not necessarily have to be the zero state. Given the knowledge that the last state has again to be the zero state, the most optimum state path for determining the stream of data fed into the encoder can be determined by the above-mentioned determination of the path metrics and subsequent back-tracing along the most probable path. It should be mentioned that what the terms "first", "last", "fourth" etc. state in the trellis diagram mean is the state in that position on the most probable state path that is determined. This state arises precisely from the transition from the previous state on this optimum path due to the bit associated with this transition.

On the basis of what has been explained up to this point, what will be considered in what follows are the differences in the case of the method according to the invention and the device according to the invention.

Figure 4:
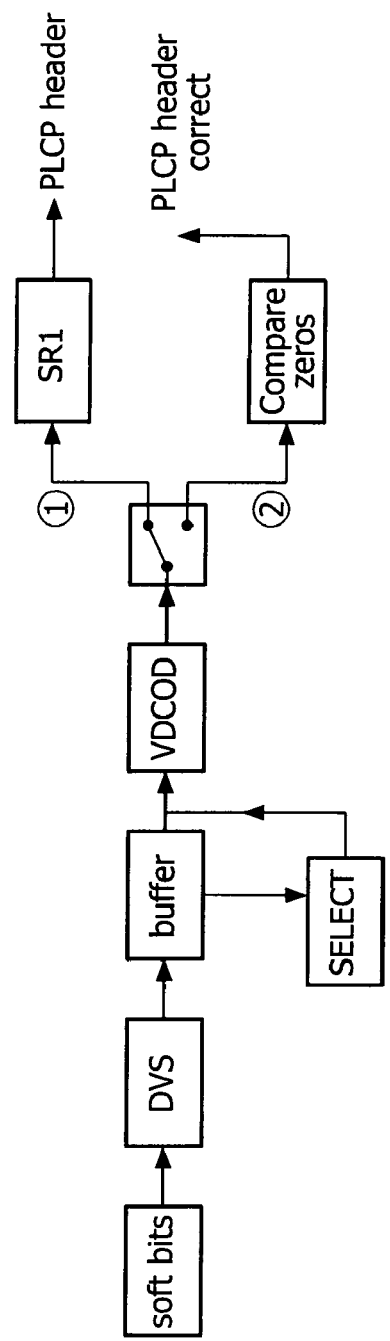
FIG. 4 shows a first circuit arrangement according to the invention for recognizing the validity of coded control information.

For this purpose, FIG. 4 is a block circuit diagram showing part of the circuit arrangement located at the reception end by which the method according to the invention for recognizing the validity of convolution-coded control information can be performed. The received data, which is quantized in the form of soft bits, is fed to the deinterleaver DVS and is then written to a buffer store Buffer. Let it now be assumed in this case that the convolution-coded signal, which comprises 48 bits under the IEEE 802.11a standard, is written to the buffer store. In a first embodiment of the invention, the last 12 bits, i.e. the received, coded bit-sequence representing the tail bits, is selected and copied by a selecting means. This copied section of convolution-coded control information is fed to the Viterbi decoder VDCOD first, followed by the 48 bits of convolution-coded control information situated in the buffer store, thus producing a total convolution-coded bit-sequence 60 bits long, which is processed in the Viterbi decoder in a conventional manner and thus generates a bit-sequence 30 bits long, although the tail bits at the end of the assembled information are not emitted. The Viterbi decoder thus emits 24 bits, the control information proper (18 bits) being prefixed by 6 bits that are associated with the 12 bits that were applied as a prefix to the convolution-coded signal. The first 6 bits should thus be identical to the tail bit-sequence if the decoding has produced valid control information. This being the case, the first 6 bits are switched out by a switch S and transferred to a bit comparator means CompareZero, in which the 6 bits are compared with the desired bit-sequence "000000". This comparison produces a logic signal that indicates whether or not the Signal field was correctly transmitted. The remaining 18 bits are clocked by the switch S into a further register SR1, in which the control information, less the tail bits, is available for further processing, and particularly for controlling the circuit arrangement for operating on the useful data that follows (see FIG. 2b).

Figure 5A:
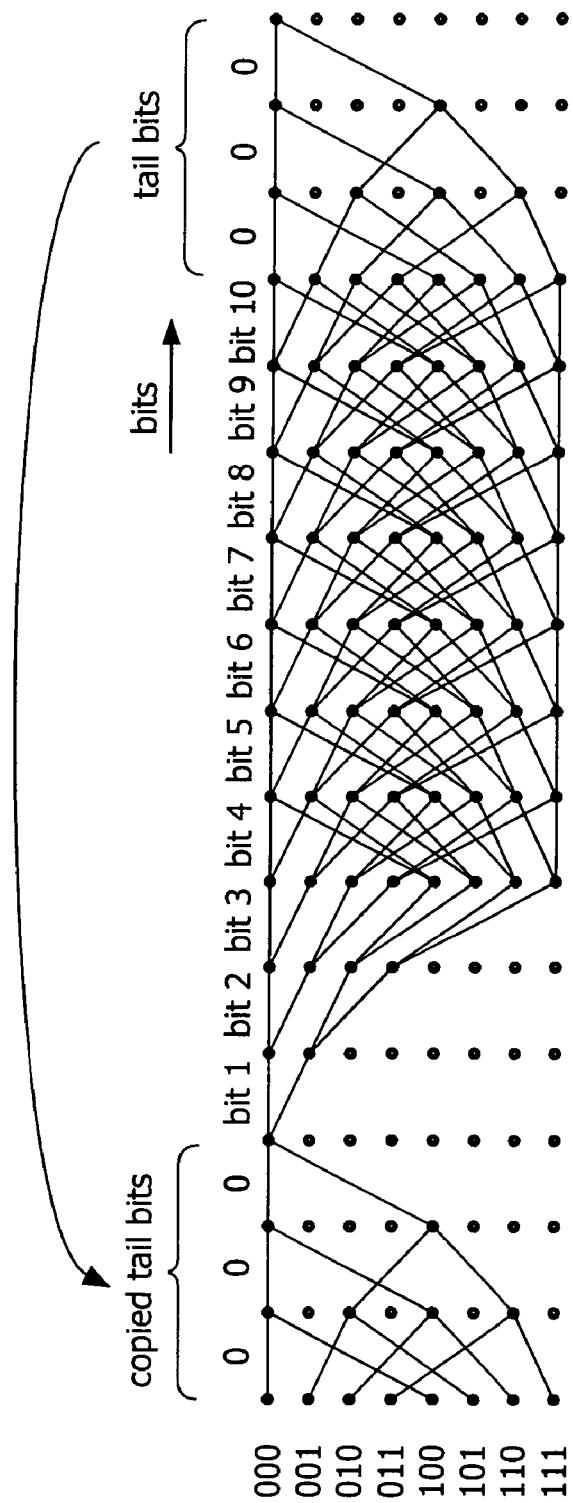
FIG. 5a shows a first trellis diagram for first assembled information.

A corresponding trellis diagram, once again with a reduced volume of data of 10 bits and with a constraint length of k=4, is shown in FIG. 5a. The last four states on the right-hand side of the diagram once again correspond to the 3 tail bits in this case. On the left-hand side the sequence has four additional states that correspond to the bits that, in accordance with the invention, are prefixed to the convolution-coded control information. With the help of these four left-hand states, or to be more exact with the help of the fourth state from the left, i.e. the state that is reached at the end of the state transitions caused by the prefixed tail bits, the probability of a valid PLCP header being recognized can be considerably improved, because it is known that the state in question has to be the zero state. Hence, what are shown are all the state paths that, by the method according to the invention, are recognized as valid in the Viterbi decoder because the state that precedes the first bit (bit 1), i.e. the state after the third transition, is the zero state. This condition is forced to exist by the placing at the front of the convolution-coded tail bits. Other trellis paths can be ruled out and are not shown in the Figures.

It should be pointed out that in other embodiments of the invention, in which the tail bit-sequence is not a sequence of zero bits, the state that precedes the first control bit proper on the most probable state path need not be a zero state but is predetermined by the tail bit-sequence that is preset in the particular case. Because the length of the tail bit-sequence (k-1) is generally dependent, for all possible tail bit-sequences, on the constraint length k, the converse of the latter statement is also true, i.e. if a given state is present at the stated point on the state path, a given decoded tail bit-sequence is thus defined. Use is made of this fact in an embodiment that is not shown, in that it is not, as described above, the decoded tail bit-sequence that is compared with its desired bit-sequence to apply a criterion of validity for the PLCP header but the specified state that is compared with the state laid down by the desired tail bit-sequence. This can easily be done by providing an appropriate means for comparing a state on the most probable state path that is determined with the preset state. Also, the last (k-1) transitions can be ignored in the back-tracing if it is only the convolution-coded tail bit-sequence that is prefixed to the convolution-coded control information in the Viterbi decoder.

Figure 5B:
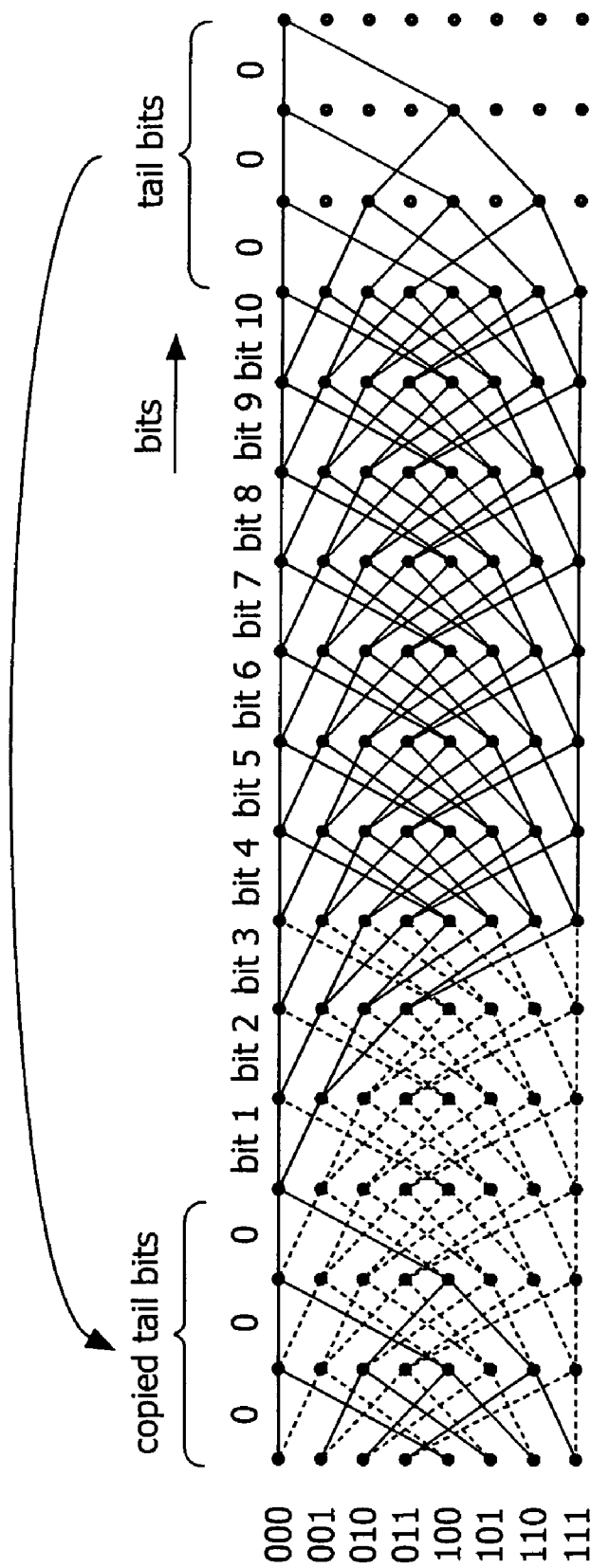
FIG. 5b shows a second trellis diagram for the first assembled information.

By contrast, in FIG. 5b are shown in addition (as dotted lines) the paths that do not extend through the zero state preceding the first bit of the control information proper (bit 1), which state is forced to exist by the convolution-coded tail bit-sequence placed at the front, which paths can thus be recognized as invalid in the Viterbi decoder by the method according to the invention.

What is more, to apply a criterion of validity for the PLCP header, the usual check may be made on the parity bit or a plausibility check may even be made in respect of the LENGTH and/or RATE subfields.

Figure 6:
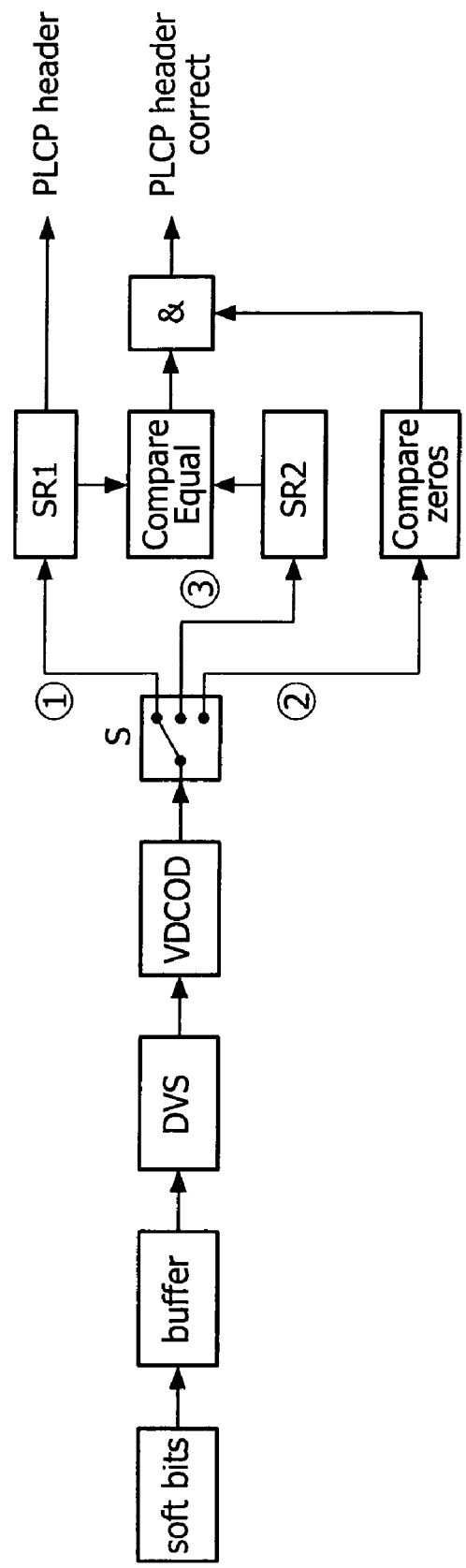
FIG. 6 shows a second embodiment according to the invention for recognizing the validity of coded control information.

A further embodiment of the invention for the IEEE 802.11a standard is shown in FIG. 6. In this case the soft bits are written to a buffer store upstream of the interleaver. The buffer store feeds the entire convolution-coded bit-sequence representing the PLCP header, i.e. 48 bits, to the deinterleaver twice in succession, and the latter feeds the 96 deinterleaved bits to the Viterbi decoder VDCOD as assembled convolution-coded information.

In an embodiment that is not shown, the buffer store is inserted downstream of the deinterleaver DVS, which means that the duplication of the bit-sequence that was mentioned takes place immediately upstream of the Viterbi decoder.

The latter calculates the path metrics in the manner stated and performs the back-tracing, beginning with the zero state that corresponds to the tail bits. The bit-sequence determined is then emitted by the Viterbi decoder, with the last 6 bits, i.e. the tail bits of the last set of control information, once again being suppressed. The tail bits of the preceding full set of control information are not suppressed by the Viterbi decoder because they are situated in the middle of the bit-sequence. For this reason, the Viterbi decoder emits 42 data bits, with the first 18 bits being clocked into the first shift register SR1 by the switch S. With the switch S in a second position, the next 6 bits are clocked into a comparator means CompareZero and are compared there with the bit-sequence "000000", the comparator means generating a signal assigned to the result of the comparison. With the switch in an appropriate position, the remaining bits 25 to 42 are clocked into a second shift register SR2. The contents of the first and second shift registers are gated in a logic gating means CompareEqual, such as an XOR gating means, and depending on whether equality or inequality is found a logic signal is generated and is fed as an input value to an AND-gating means &.

In response to the comparison of the 6 bits following the first 18 bits with the desired value "000000", which comparison occurs as a result of the switch being in position 2, a logic value is once again generated and is fed to the AND-gating means &, thus causing the latter to emit from its output the logic value for "PLCP header correct" if both the comparison of the two sections of control information, and the comparison of the sequence of 6 bits situated between the two section of useful control information data with the tail bits, showed there to be a match.

Figure 7:
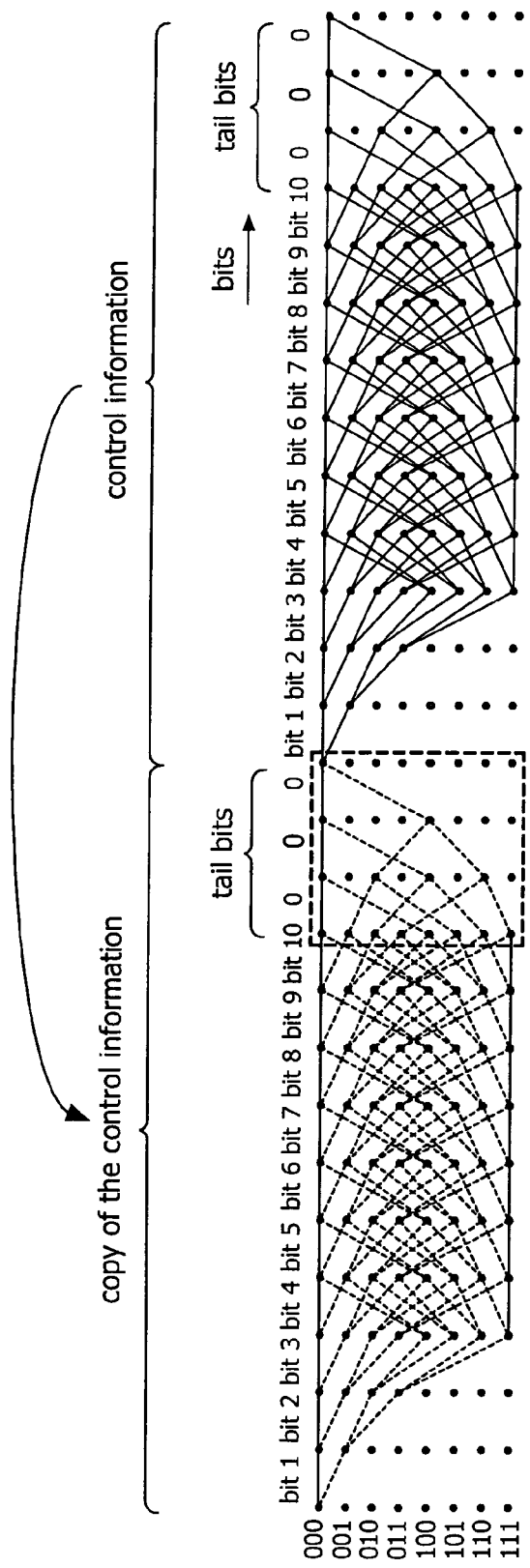
FIG. 7 shows a trellis diagram for second assembled information.

A corresponding trellis diagram, once again with a reduced volume of data of 10 bits and with a constraint length of k=4, is shown in FIG. 7. The last four states on the right-hand side of the diagram once again correspond to the 3 tail bits at the ends of the paths in this case, these two bits not being emitted by the Viterbi decoder. The first 4 states to the left of the center of the state sequence are assigned to the tail bits of the first of the two sets of convolution-coded control information fed into the Viterbi decoder. Referring to the explanations given in relation to FIGS. 5a/b, what are shown in FIG. 7 are the state paths that are recognized as valid because they all pass through the zero state that is produced by the last tail bit of the prefixed control information. For the sake of clarity of depiction, the path sections associated with the prefixed control information are shown dotted in FIG. 7.

The decoded bits for these states that result from the backtracing are compared, as was explained with reference to FIG. 6, with the respective tail bits to allow a value specifying the validity of the decoded control information to be generated. What is more, sections of control information from the two decoded sets of control information, but not including the respective tail bits, are also compared to allow a value that specifies the validity of the decoded control information to be generated The method according to the invention that has been described and the circuit arrangement according to the invention may also advantageously be used, in the case of an IEEE 802.11g network, to rule out the possibility of an IEEE 802.11a signal being present when an incorrect PLCP header is acquired. In response to this possibility being ruled out, a check may then be made to see whether the signal acquired is a DSSS-modulated or a CCK-modulated signal, i.e. whether it is a signal to the IEEE 802.11b standard.

LIST OF REFERENCES

Buffer
COD
CompareZeros
CompareEqual
DMOD
DVS
EA
MOD
S
SA
Select
SR1, SR2
VDCOD
VS
&
Buffer store
Encoder
Comparator means
Comparator means
Demodulator
Deinterleaver
Reception antenna
Modulator
Switching means
Transmission antenna
Selecting means
Shift registers
Viterbi decoder
Interleaver
Gating means

The invention claimed is:

1. A method for recognizing the validity of convolution-coded control information that is transmitted, together with useful data that is associated with and follows the convolution-coded control information, as a data signal over a transmission path subject to interference, the control information having, at its end, a preset, (k-1) long tail bit-sequence and a convolutional encoder, which has a constraint length of k, being preloaded with the tail bit-sequence prior to the convolutional coding of the control information, and, after transmission, the received, convolution-coded control information being decoded in a Viterbi decoder on the basis of finding a path in the trellis diagram having a maximum or minimum accumulated metric, the method comprising:

communicating at least an end section of the received, convolution-coded control information as a prefix to the received, convolution-coded control information, the length of the end section being at least that of the convolution-coded tail bit-sequence, and feeding the prefixed control information to the Viterbi decoder to allow the convolution-coded control information to be decoded.

2. The method according to claim 1, wherein the received, prefixed convolution-coded control information includes two identical sets of convolution-coded control information, which are arranged one behind the other, being fed to the Viterbi decoder.

3. The method according to claim 2, wherein the sections of control information that are associated in the given case in the two sets of control information are selected from the decoded bit-sequence and are compared with one another, the result of the comparison of the two sections being used as a partial criterion of the validity of the received control information, or the received control information being accepted as valid in response to a match between the two sections.

4. The method according to claim 3, wherein the sections of control information that are selected each comprise the complete set of control information not including the associated tail bit-sequence.

5. The method according to claim 1, wherein in the decoded bit-sequence, that section of the bit-sequence that lies between the two decoded sections of useful control information data is compared with the tail bit-sequence, the result of the comparison of the two sections being used as a partial criterion of the validity of the received control information, or the received control information being accepted as valid in response to a match between the two sections.

6. The method according to claim 4, wherein the signal is generated in each case in response to the checks, and the signals from two checks are gated with one another logically to provide a signal associated with the validity of the control information.

7. The method according to claim 1, wherein the received, convolution-coded control information is prefixed with precisely the received, convolution-coded tail bit-sequence, and the decoded bit-sequence that corresponds to the convolution-coded bit-sequence that is added as a prefix is compared with the tail bit-sequence, the result of the comparison being used as a partial criterion of the validity of the received control information, or the received control information being accepted as valid in response to a match.

8. The method according to claim 1, wherein a state that acts as a starting state for the first bit of the control information on the state path determined in the trellis diagram is compared with a preset state laid down by the tail bit-sequence, the result of the comparison being used as a partial criterion of the validity of the received control information, or the received control information being accepted as valid in response to a match.

9. The method according to claim 1, wherein the data signal is formatted to the IEEE 802.11a standard, the control information being the 24-bit-wide PLCP (physical layer convergence procedure) header.

10. The method according to claim 1, wherein parity information contained in the control information and/or plausibility appraisals relating to at least one subfield of the control information are used to enable the validity of the recovered control information to be recognized.

11. The method according to claim 1, wherein in an IEEE 802.11g network, on the control information being recognized as invalid, the possibility of an OFDM (orthogonal frequency division multiplexing) modulated signal is ruled out and a check is made to see whether the signal present is some other standardized modulated signal and in particular a DSSS (direct sequence spread spectrum) or a CCK (complementary code keying) modulated signal.

12. The method according to claim 1, wherein the convolution-coded control information is acquired as a soft bit-sequence, and the prefixed control information is generated prior to passage through a deinterleaver inserted upstream of the Viterbi decoder, the soft bit-sequence that represents the control information being read into a buffer store.

13. A circuit arrangement for performing the method as recited in claim 1 for recognizing the validity of convolution-coded control information that is transmitted, together with useful data that is associated with and follows it, as a data signal over a transmission path subject to interference, the control information having a preset tail bit-sequence, said circuit arrangement comprising: a Viterbi decoder in which the received, convolution-coded control information is decoded on the basis of finding a path in the trellis diagram having a maximum or minimum accumulated metric: and locigic circuitry inserted upstream of the Viterbi decoder, for generating an assembled signal in which at least an end section of the received, convolution-coded control information is arranged in front of the received, convolution-coded control information, the length of the section being at least that of the convolution coded tail bit sequence, and feeding the assembled information to the Viterbi decoder.

14. A circuit arrangement as claimed in claim 13, characterized by a logic selection circuit inserted downstream of the Viterbi decoder for selecting and comparing associated sections of control information in the assembled bit-sequence that is decoded, and for forming a logic value that specifies a match between the sections of control information.

15. A circuit arrangement as claimed in claim 14, characterized by a means inserted downstream of the Viterbi decoder for selecting that bit-sequence section that is associated with a tail bit-sequence and that is situated between the associated sections of control information in the bit-sequence that is decoded and for comparing the bit-sequence section in question with the tail bit-sequence, and for forming a logic value that states that the comparison has found a match.

16. A circuit arrangement as claimed in claim 14, characterized by a logic gating circuit that generates a signal specifying that the control information is valid in response to the two logic values.

17. A circuit arrangement as claimed in claim 13, characterized by means associated with the Viterbi decoder for comparing a state at a predetermined transition in the trellis diagram on the most probable state path that is determined, with a preset state that depends on the tail bit-sequence.

18. A circuit arrangement as in claim 14, characterized by means associated with the Viterbi decoder for comparing a state at a predetermined transition in the trellis diagram on the most probable state path that is determined, with a preset state that depends on the tail bit-sequence.

19. A circuit arrangement as in claim 15, characterized by means-associated with the Viterbi decoder for comparing a state at a predetermined transition in the trellis diagram on the most probable state path that is determined, with a preset state that depends on the tail bit-sequence.

20. A circuit arrangement as in claim 16, characterized by means associated with the Viterbi decoder for comparing a state at a predetermined transition in the trellis diagram on the most probable state path that is determined, with a preset state that depends on the tail bit-sequence.

* * * * *